(12) United States Patent
Toba

(10) Patent No.: US 7,269,282 B2
(45) Date of Patent: Sep. 11, 2007

(54) METHOD FOR DETERMINING WHETHER PHOTOGRAPHIC IMAGE IS DIFFERENT-LIGHT-SOURCE PHOTOGRAPHIC IMAGE AND PHOTOGRAPHIC IMAGE PROCESSING APPARATUS

(75) Inventor: Hiroshi Toba, Kainan (JP)

(73) Assignee: Noritsu Koki Co., Ltd., Wakayama (JP)

( * ) Notice: Subject to any disclaimer, the term of this patent is extended or adjusted under 35 U.S.C. 154(b) by 724 days.

(21) Appl. No.: 10/831,208

(22) Filed: Apr. 26, 2004

(65) Prior Publication Data

US 2005/0013481 A1    Jan. 20, 2005

(30) Foreign Application Priority Data

Apr. 24, 2003   (JP) .............................. 2003-119760

(51) Int. Cl.
   *G06K 9/00*   (2006.01)
(52) U.S. Cl. ..................................... 382/162
(58) Field of Classification Search ................ 382/162, 382/165–167, 252, 254; 358/1.9, 518, 520; 356/406; 396/225; 250/226; 355/35–38; 345/589, 591, 593
   See application file for complete search history.

(56) References Cited

U.S. PATENT DOCUMENTS

| | | | |
|---|---|---|---|
| 4,279,502 A | 7/1981 | Thurm et al. | |
| 5,959,720 A | 9/1999 | Kwon et al. | |
| 6,836,345 B1 * | 12/2004 | Setchell | ...................... 358/1.9 |
| 6,853,747 B1 * | 2/2005 | Matsuura et al. | ........... 382/167 |
| 6,915,021 B2 * | 7/2005 | Cannata et al. | ............. 382/254 |
| 6,987,586 B2 * | 1/2006 | Bogdanowicz et al. | ...... 358/1.9 |

FOREIGN PATENT DOCUMENTS

| | | |
|---|---|---|
| DE | 29 12 130 A | 10/1980 |
| DE | 196 38 333 A | 4/1997 |
| EP | 0 612 183 A | 8/1994 |
| JP | 7-219077 A | 8/1995 |
| JP | 2001-238177 A | 8/2001 |
| JP | 2002-257627 A | 9/2002 |

* cited by examiner

*Primary Examiner*—Jose L. Couso
(74) *Attorney, Agent, or Firm*—Smith Patent Office

(57) ABSTRACT

Data on a target film image is developed so as to correspond to a predetermined X-Y two-dimensional coordinate system representing a relationship between RGB average data on each constituent pixel and respective color component data, developed pixels are divided to a plurality of groups so that pieces of the RGB average data on the respective pixels are arranged equidistantly, an average of dissociations of the respective pixels relative to a reference line representing characteristics of a film image photographed by a standard light is operated and derived as a group difference sum for each of the divided groups, for each of R, G, and B, a thickness factor for normalizing a distribution thickness of a pixel distribution in a direction in which the pixel distribution is distanced from the reference line is operated and derived, for each of the divided groups, an image difference sum is operated and derived by a product-sum operation between the group difference sum and the thickness factor, and if the image difference sum for the R, G, or B is greater than a predetermined value, the target film image is determined as a photographic image photographed using different types of light sources.

6 Claims, 13 Drawing Sheets
(5 of 13 Drawing Sheet(s) Filed in Color)

BEFORE CORRECTION    AFTER CORRECTION

TUNGSTEN LIGHT SCENE

TUNGSTEN LIGHT SCENE WITH FAILURE

UNDERWATER PHOTOGRAPHIC SCENE

TUNGSTEN LIGHT PHOTOGRAPH

SCATTER DIAGRAM
OF TUNGSTEN LIGHT
PHOTOGRAPH

DIFFERENT-COLOR STRUCTURE PHOTOGRAPH

SCATTER DIAGRAM
OF DIFFERENT-COLOR STRUCTURE
PHOTOGRAPH

TUNGSTEN LIGHT PHOTOGRAPH,
SCATTER DIAGRAM OF MINIMUM REFERENCE

DIFFERENT-COLOR STRUCTURE PHOTOGRAPH,
SCATTER DIAGRAM OF MINIMUM REFERENCE ($\gamma$ CURVE)

SCATTER DIAGRAM OF TUNGSTEN LIGHT PHOTOGRAPH

SCATTER DIAGRAM OF UNDERWATER PHOTOGRAPH

METHOD FOR DETERMINING WHETHER PHOTOGRAPHIC IMAGE IS DIFFERENT-LIGHT-SOURCE PHOTOGRAPHIC IMAGE AND PHOTOGRAPHIC IMAGE PROCESSING APPARATUS

BACKGROUND OF THE INVENTION

1. Field of the Invention

The present invention relates to a method for determining whether a photographic image is a different-light-source photographic image and a photographic image processing apparatus.

2. Description of the Related Art

Normally, a film used for photography is referred to as "a daylight film". If photography is performed with a solar light or a strobe light, a photograph having an appropriate color balance is obtained. However, since photography is performed in various situations, inappropriate images are, quite often, recorded on a film. Examples of photographic scenes include a scene photographed with a tungsten light, a scene photographed with a fluorescent light, a scene photographed underwater, and the like. Thus, scenes are photographed using different light sources. For example, a photographic image photographed with the tungsten light is generally yellowish and that photographed with the fluorescent light or photographed underwater is generally bluish.

As conventional methods for determining whether photographic images are photographed using different types of light sources, there are known the following techniques. Japanese Unexamined Patent Publication No. 2001-238177 discloses a technique for acquiring additional information such as a position, a climate, and a time when a subject is photographed by a camera, estimating a photographic scene based on the additional information, and performing an image processing such as a gradation processing according to the estimated photographic scene. Japanese Unexamined Patent Publication No. 2002-257627 discloses a technique for fetching two different pieces of image data on cuts in an infrared region from the same subject, and determining types of photographic light sources based on comparison between the images. Japanese Unexamined Patent Publication No. 7-219077 discloses a technique for estimating a type of a light that illuminates a subject based on average brightness information during photography and presence or absence of a flash light.

However, the conventional methods have the following disadvantages. With the method disclosed by Japanese Unexamined Patent Publication 2001-238177, it is required to additionally provide the camera with a device for inputting information on photographic scenes. The camera is, therefore, limited to a specific expensive camera. For an image photographed by an ordinarily available camera which does not include such a function, the method cannot be used. With the method disclosed by Japanese Unexamined Patent Publication 2002-257627, similarly to the method disclosed by Japanese Unexamined Patent Publication 2001-238177, it is required to provide an expensive different light source determination apparatus. With the method disclosed by Japanese Unexamined Patent Publication 7-219077, if it is erroneously determined that an image obtained by photographing a scene in which a yellow signboard is included in a subject is a photograph taken with a tungsten light, and image data is corrected based on the erroneous determination, then a color failure occurs.

SUMMARY OF THE INVENTION

The present invention has been achieved in light of the conventional disadvantages. It is an object of the present invention to provide a method for determining whether a photographic image is a different-light-source photographic image and a photographic image processing apparatus using the determination method capable of ensuring determining whether a photographic image a different-light-source photographic image even if no matter what subject is taken by no matter what camera.

According to a first aspect of the present invention, there is provided a different-type-light-source photographic image determination method comprising: a first step of developing data on a target film image so as to correspond to a predetermined X-Y two-dimensional coordinate system representing a relationship between RGB average data on each constituent pixel and respective color component data, and of dividing developed pixels to a plurality of groups so that pieces of the RGB average data on the respective pixels are arranged equidistantly; a second step of operating and deriving an average of dissociations of the respective pixels relative to a reference line representing characteristics of a film image photographed by a standard light as a group difference sum for each of the divided groups, for each of R, G, and B; a third step of operating and deriving a thickness factor for normalizing a distribution thickness of a pixel distribution in a direction in which the pixel distribution is distanced from the reference line, for each of the divided groups; and a fourth step of operating and deriving an image difference sum by a product-sum operation between the group difference sum operated and derived in the second step and the thickness factor operated and derived in the third step, wherein if the image difference sum for the R, G, or B operated and derived in the fourth step is greater than a predetermined value, the target film image is determined as a photographic image photographed using different types of light sources.

The method according to the first aspect of the present invention further comprises: a fifth step, executed after the fourth step, of developing the data on the target film image so as to correspond to a predetermined X-Y two-dimensional coordinate system representing a relationship between a minimum of component data on the, R, G, and B for the each constituent pixel and the component data on the R, G, and B relative to the minimum; a sixth step of operating and deriving, from the pixel data developed in the fifth step, the average of the dissociations of the respective pixels relative to the reference line representing the characteristics of the film image photographed by the standard light as a minimum difference sum at least for a pixel group of the R, G, or B; and a seventh step of determining that the target film image is a photographic image in which a structure having different colors is photographed if the minimum difference sum for the pixel group of the R, G, or B operated and derived in the sixth step is greater than a predetermined reference value, wherein if the image difference sum for the R, G, or B operated and derived in the fourth step is greater than the predetermined value, and it is determined in the seventh step that the target film image is not the photographic image in which the structure having the different colors is photographed, then the target film image is determined as the photographic image photographed using the different types of the light sources.

According to a second aspect of the present invention, there is provided a photographic image processing apparatus that embodies the different-type-light-source photographic image determination method, characterized in that the apparatus is constituted to comprise: image data first development means for developing data on the target film image so as to correspond to a predetermined X-Y two-dimensional coordinate system representing a relationship between RGB average data on each constituent pixel and respective color component data; group difference sum operation means for dividing developed pixels to a plurality of groups so that pieces of the RGB average data on the respective pixels are arranged equidistantly, and for operating and deriving an average of dissociations of the respective pixels relative to a reference line representing characteristics of a film image photographed by a standard light as a group difference sum for each of the divided groups, for each of R, G, and B; thickness factor operation means for operating and deriving a thickness factor for normalizing a distribution thickness of a pixel distribution in a direction in which the pixel distribution is distanced from the reference line, for each of the divided groups; image difference sum operation means for operating and deriving an image difference sum by a product-sum operation between the group difference sum operated and derived by the group difference sum operation means and the thickness factor operated and derived by the thickness factor operation means; and different-type-light-source image determination means for determining that the target film image is the photographic image photographed using the different types of the light sources if the image difference sum for the R, G, or B operated and derived by the image difference sum operation means is greater than a predetermined value.

According to a third aspect of the present invention, there is provided a photographic image processing apparatus capable of determining whether a target film image is a photographic image photographed using different types of light sources, characterized in that the apparatus is constituted to comprise: image data first development means for developing data on the target film image so as to correspond to a predetermined X-Y two-dimensional coordinate system representing a relationship between RGB average data on each constituent pixel and respective color component data;

group difference sum operation means for dividing developed pixels to a plurality of groups so that pieces of the RGB average data on the respective pixels are arranged equidistantly, and for operating and deriving an average of dissociations of the respective pixels relative to a reference line representing characteristics of a film image photographed by a standard light as a group difference sum expressed by an Equation 1 for each of the divided groups, for each of R, G, and B, the Equation 1 being:

$S(i)=\{\Sigma C_j \cos\theta-((R_j+G_j+B_j)/3)\sin\theta\}/n$, where the $S(i)$ is the group difference sum of an $i^{th}$ group, the $C_j$ is a pixel density of R, G, or B of a $j^{th}$ pixel, the $\theta$ is an angle between the reference line and an X axis, and the n is the number of pixels of the $i^{th}$ group;

thickness factor operation means for operating and deriving a thickness factor for normalizing a distribution thickness of a pixel distribution in a direction in which the pixel distribution is distanced from the reference line, for each of the divided groups, the thickness factor expressed by an Equation 2, the Equation 2 being:

$G(i)=A/[\{(\Sigma C_{mMAX} \cos\theta-((R_m+G_m+B_m)/3)\sin\theta)/m\}-\{(\Sigma C_{mMIN}\cos\theta-((R_m+G_mB_m)/3)\sin\theta)/m\}]$, where at $G(i)\geq 1$, $G(i)=1$, the $G(i)$ is the thickness factor of the pixel distribution of the $i^{th}$ group, the A is a constant, the $C_{mMAX}$ is a maximum pixel density of the R, G, or B when the RGB average density is $(R_m+G_m+B_m)/3$, the $C_{mMIN}$ is a minimum pixel density of the R, G, or B when the RGB average density is $(R_m+G_m+B_m)/3$, and the m is the number of pixels in the group having the maximum or minimum;

image difference sum operation means for operating and deriving an image difference sum expressed by an Equation 3 by a product-sum operation between the group difference sum operated and derived by the group difference sum operation means and the thickness factor operated and derived by the thickness factor operation means, the Equation 3 being:

$S=S_B+[\Sigma\{S(i)-S_B\}\times G(i)]/I$, where the I is the number of groups, the $S_B$ is a reference group difference sum that is a difference sum of the group for which the difference between the average maximum and the average minimum derived by the group difference sum operation means is the minimum; and different-type-light-source image determination means for determining that the target film image is the photographic image photographed using the different types of the light sources if the image difference sum for the R, G, or B operated and derived by the image difference sum operation means is greater than a predetermined value.

The photographic image processing apparatus according to the second aspect of the present invention is constituted to further comprise image data second development means for developing the data on the target film image so as to correspond to a predetermined X-Y two-dimensional coordinate system representing a relationship between a minimum of component data on the, R, G, and B for the each constituent pixel and the component data on the R, G, and B relative to the minimum; minimum difference sum operation means for operating and deriving, from the pixel data developed by the image data second development means, the average of the dissociations of the respective pixels relative to the reference line representing the characteristics of the film image photographed by the standard light as a minimum difference sum at least for a pixel group of the R, G, or B; and different-color structure determination means for determining that the target film image is a photographic image in which a structure having different colors is photographed if the minimum difference sum for the pixel group of the R, G, or B operated and derived by the minimum difference sum operation means is greater than a predetermined reference value, wherein if the image difference sum for the R, G, or B operated and derived by the image difference sum operation means is greater than the predetermined value, and the different-color structure determination means determines that the target film image is not the photographic image in which the structure having the different colors is photographed, then the different-type-light-source image determination means determines that the target film image is the photographic image photographed using the different types of the light sources.

Further, the photographic image processing apparatus according to the second aspect is constituted so that the minimum difference sum operation means operates and derives the minimum difference sum based on an Equation 4, the Equation 4 being:

$S=\{\Sigma C_j \cos\theta-(\text{MIN}(R_j, G_j, B_j))\sin\theta\}/n$, where the S is the minimum difference sum, the $C_j$ is the pixel density of the R or B of the $j^{th}$ pixel, the $\theta$ is the angle between the reference line and the X axis, and the n is the number of pixels.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DESCRIPTION OF THE PREFERRED EMBODIMENT

A photographic processing apparatus using a method for determining whether a photographic image is photographed using different types of light sources, and the determination method according to the present invention will be described hereinafter with reference to the drawings.

Figure 1:
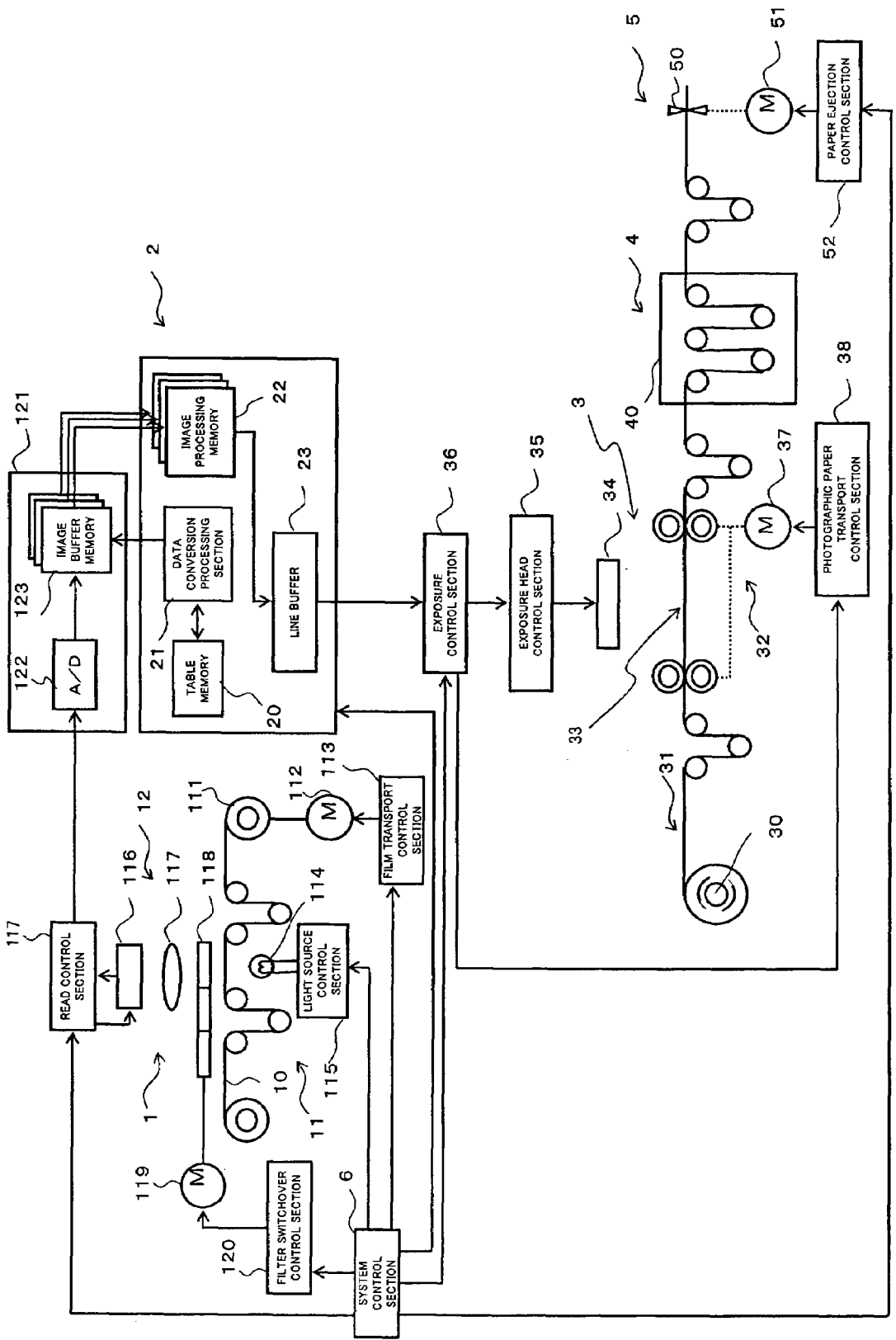
FIG. 1 is a block diagram which depicts that a photographic image processing apparatus according to the present invention is divided to functional blocks.

As shown in FIG. 1, a photographic image processing apparatus includes an image data input section 1 which reads an image from a film and which stores the read image in a memory, an image data processing section 2 which conducts a predetermined data processing or the like to the image data input from the image data input section 1, an image exposure section 3 including an exposure head that exposes a photographic paper based on the processed image data, a development processing section 4 which develops the exposed photographic paper, a paper ejection section 5 which cuts off the developed photographic paper to frames, and which ejects the photographic paper thus cut off, and a system control section 6 which integrally controls the respective functional blocks to operate.

The image data input section 1 is comprised of, for example, a film transport section 11 which intermittently transports the respective 135 frames of developed color negative film 10, and an image read section 12 which reads images of the respective frames of the film 10.

The film transport section 11 includes a winding roller 111, a film transport motor 112 which drives the winding roller 111 to rotate, and a film transport control section 113 which controls the film transport motor 112.

The image read section 12 includes a light source 114 arranged below the film 10, a light source control section 115 which controls a luminous intensity of the light source 114, an imaging device 116 which includes a two-dimensional CCD, a read control section 117 which controls the imaging device 116 to read an image, a lens 117 which forms images of the respective frames of the film 10 on a light receiving surface of the imaging device 116, an optical filter 118 which is provided between the film 10 and the lens 117, and which separates the images of the film 10 to three colors of G, R, and B, a filter driving motor 119 which drives the optical filter 118 to be switched, a filter switchover control section 120 which controls the filter driving motor 119 to drive the optical filter 118, and an image data storage section 121 which stores image signals read by the imaging device 116 as digital data.

The image data storage section 121 includes an A/D converter 122 which converts analog image signals of the three colors of R, G, and B read by the imaging device 116 to digital image data on the three colors of R, G, and B at a 16-bit gradation level, respectively, and an image buffer memory 123 comprised of a RAM or the like that stores the digital image data on the three colors of R, G, and B converted by A/D converter.

The image data processing section 2 includes a table memory 20 which stores table data or the like used when executing predetermined processings including various correction processings such as a different-type-light-source image correction processing and a gradation processing to be described later, and a layout processing to the image data on the respective frames stored in the image buffer memory 123, an image data conversion processing section 21 which reads the image data stored in the image buffer memory 123, and which executes predetermined data conversion processings such as the different-type-light-source image correction processing, a different-color-structure determination processing, a gradation correction processing, and a variable power processing, an image processing memory 22 which is used for the image data conversion processings performed by the image data conversion processing section 21, and which stores the converted image data in regions defined for the respective colors of R, G, and B as final image data on each frame, a line buffer memory 23 which temporarily stores image data corresponding to one line in the final image data, and the like.

The image exposure section 3 includes a photographic paper transport section 32 which includes a photographic paper transport control section 38 driving the transport motor 37 to transport a longitudinal photographic paper 31 rolled around a roll cassette 30 toward an exposure station 33 at a predetermined transport speed, an exposure head 34 of an optical shutter type which is made of PLZT ((pb, La)(Zr, Ti)O$_3$), and which exposes and scans the photographic paper 31 transported to the exposure station 33, an exposure head control section 35 which controls driving of the exposure head 34, and an exposure control section 36 which outputs the image data from the line buffer memory 23 to the exposure head control section 35 at a predetermined timing synchronized with the transport speed of the photographic paper 31.

The development processing section 4 includes a processing tank 40 filled with a development processing liquid such as a developer, and a transport control section which transports the exposed rolled photographic paper 31 into the processing tank 40, and which transports the rolled photographic paper 31 that has been subjected to respective processings of development, bleaching, and fixing to the paper ejection section 5. The paper ejection section 5 includes a cutter 50 which cuts off the rolled photographic paper 31 developed by the development processing section 4 in a width direction, and which divides the paper 31 into frames, and a paper ejection control section 52 which controls a cutter motor 51 to drive the cutter 50, and which controls the photographic paper thus cut off to be ejected to an outside of the apparatus.

The system control section 6 includes a CPU, a ROM that stores a control program, a RAM for data processing, and a control signal input and output circuit for control signals transmitted to the respective functional blocks. The system control section 6 controls the respective functional blocks to be integrated based on the control program.

The image data processing section 2 will be described in detail.

Figure 14A:
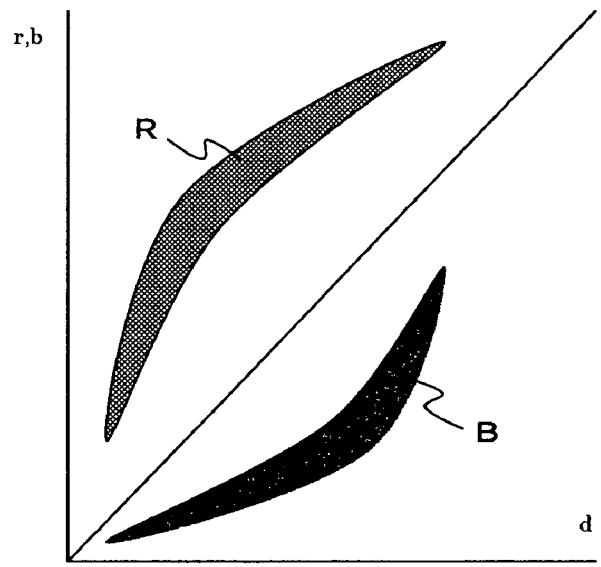
FIGS. 14A and 14B are scatter diagrams which depict the different-type-light-source image with the different-type-light-source images.
Figure 14B:
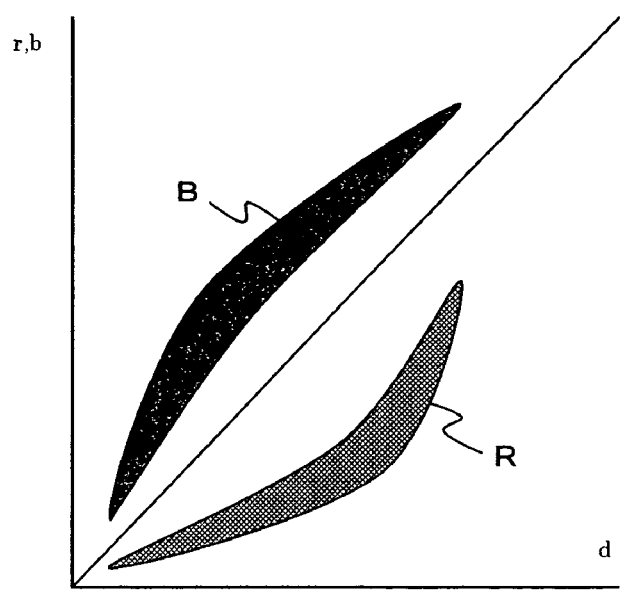

A photographic image photographed using light sources of different types, for example, the tungsten light is represented by a scatter diagram with an X axis indicating an average density and a Y axis indicating respective densities of R, G, and B. If so, as shown in FIG. 14A, an R component is maldistributed upward and a B component is maldistributed downward relative to a reference line (which is a line having a tilt angle of 45 degrees) representing characteristics of a film image photographed using a standard light. In addition, a photographic image photographed underwater is represented by a scatter diagram. If so, as shown in FIG. 14B, a B component is maldistributed upward and an R component is maldistributed downward relative to the reference line. As for a photographic image photographed using the standard light (solar light), by contrast, R, G, and B components are uniformly distributed relative to the reference line. Thus, it is possible to determine whether the photographic image is a different-type-light-source image based on degrees of maldistribution of the color components of pixels.

Figure 9:
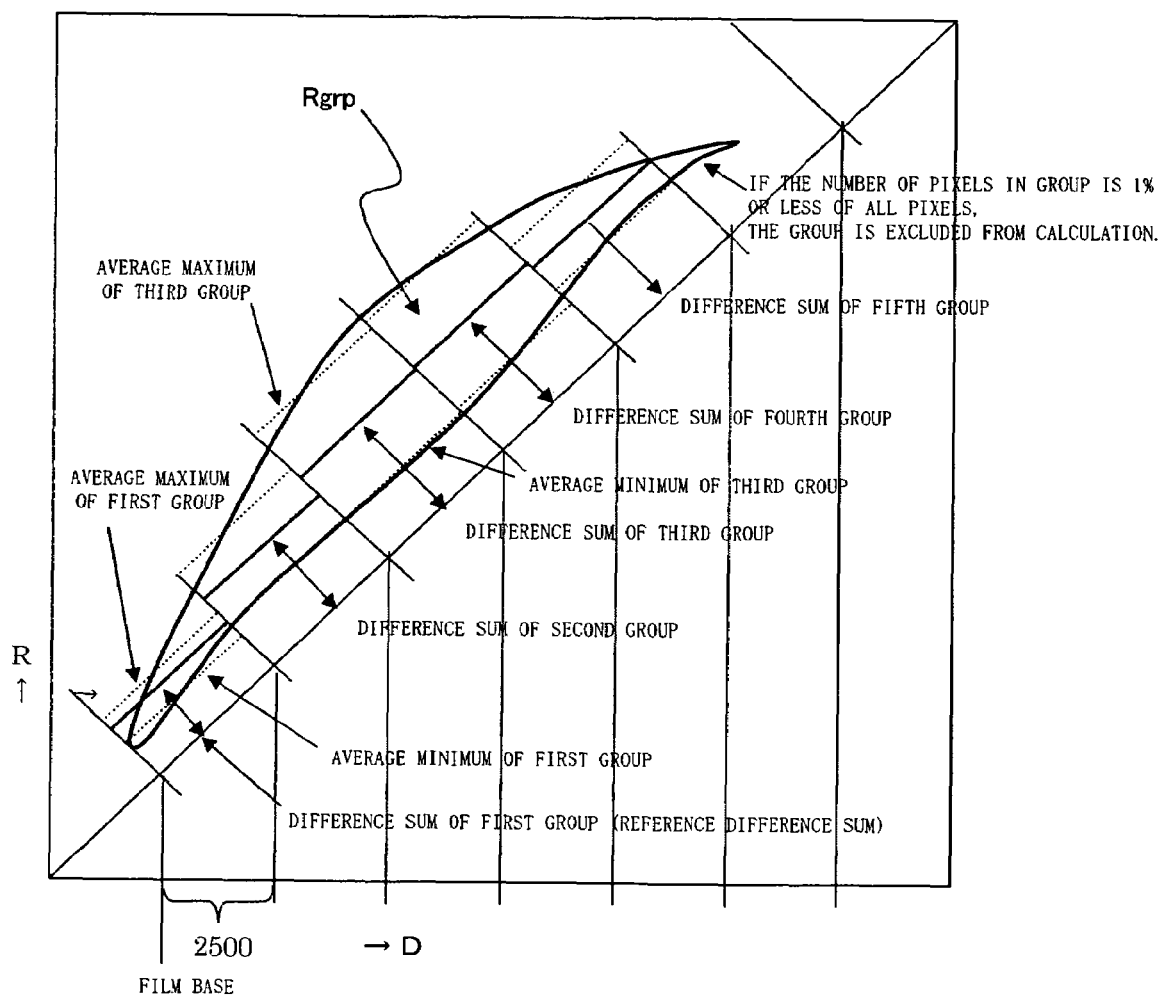
FIG. 9 is an explanatory view for an image difference sum operation.

Therefore, as shown in FIG. 9, pixels are developed so as to correspond to a predetermined X-Y two-dimensional coordinate system that represents a relationship among RGB average data on each constituent pixel and data on respective color components. The developed pixels are divided to a plurality of groups so that the RGB average data on the respective pixels are arranged equidistantly. For each of the divided groups, an average of dissociations of the respective pixels relative to the reference line representing the characteristics of the film image photographed using the standard light is calculated as a group difference sum. The degrees of maldistribution of color components of pixels in each group can be thereby determined based on the difference sums.

Figure 10A:
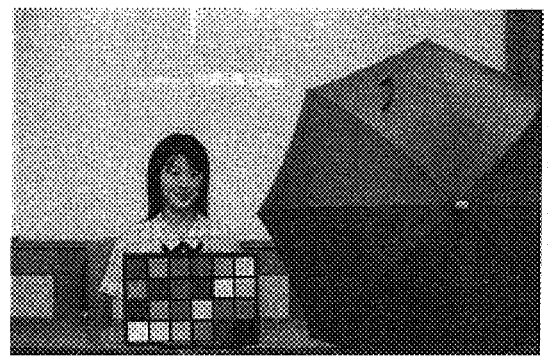
FIGS. 10A and 10B are explanatory views for a different-color structure photograph.
Figure 10B:
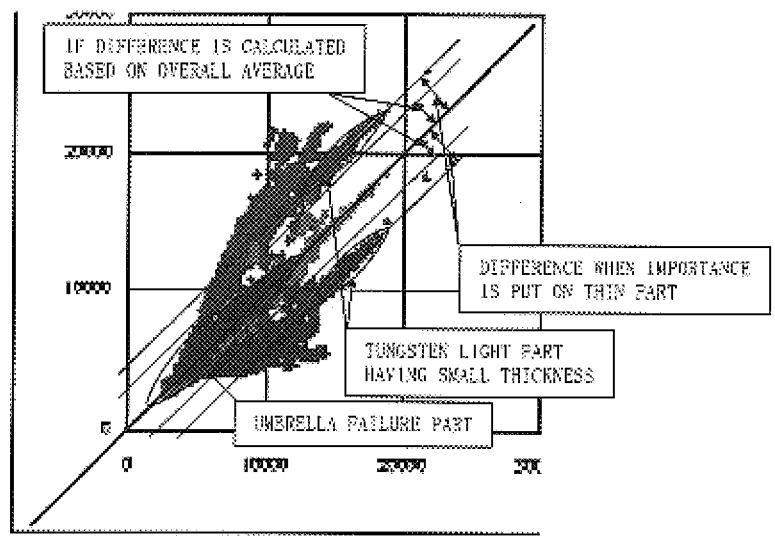

However, if dissociation degrees of all pixels in the scatter diagram shown in FIG. 10B are to be determined for a different-type-light source scene having an image failure as shown in, for example, FIG. 10A, the dissociations cannot be often determined accurately due to an influence of a failure of an umbrella in a photograph shown in FIG. 10A. If so, the dissociations are determined while putting an importance on a part (a wall part in the photograph) which is influenced by the tungsten light and in which a thickness of a pixel distribution is small, whereby the influence of the failure can be suppressed to be small.

A thickness factor is operated and derived so as to evaluate the thickness of the pixel distribution of each of the divided groups, and an image difference sum is operated and derived by a product-sum operation between the group difference sum and the thickness factor. If one of the image difference sum of the respective colors of R, G, and B thus operated and derived is greater than a predetermined value, the image is determined as a different-type-light-source photographic image. It is thereby possible to reduce the influence of the failure and accurately determine whether the image is the different-type-light-source photographic image.

Figure 2:
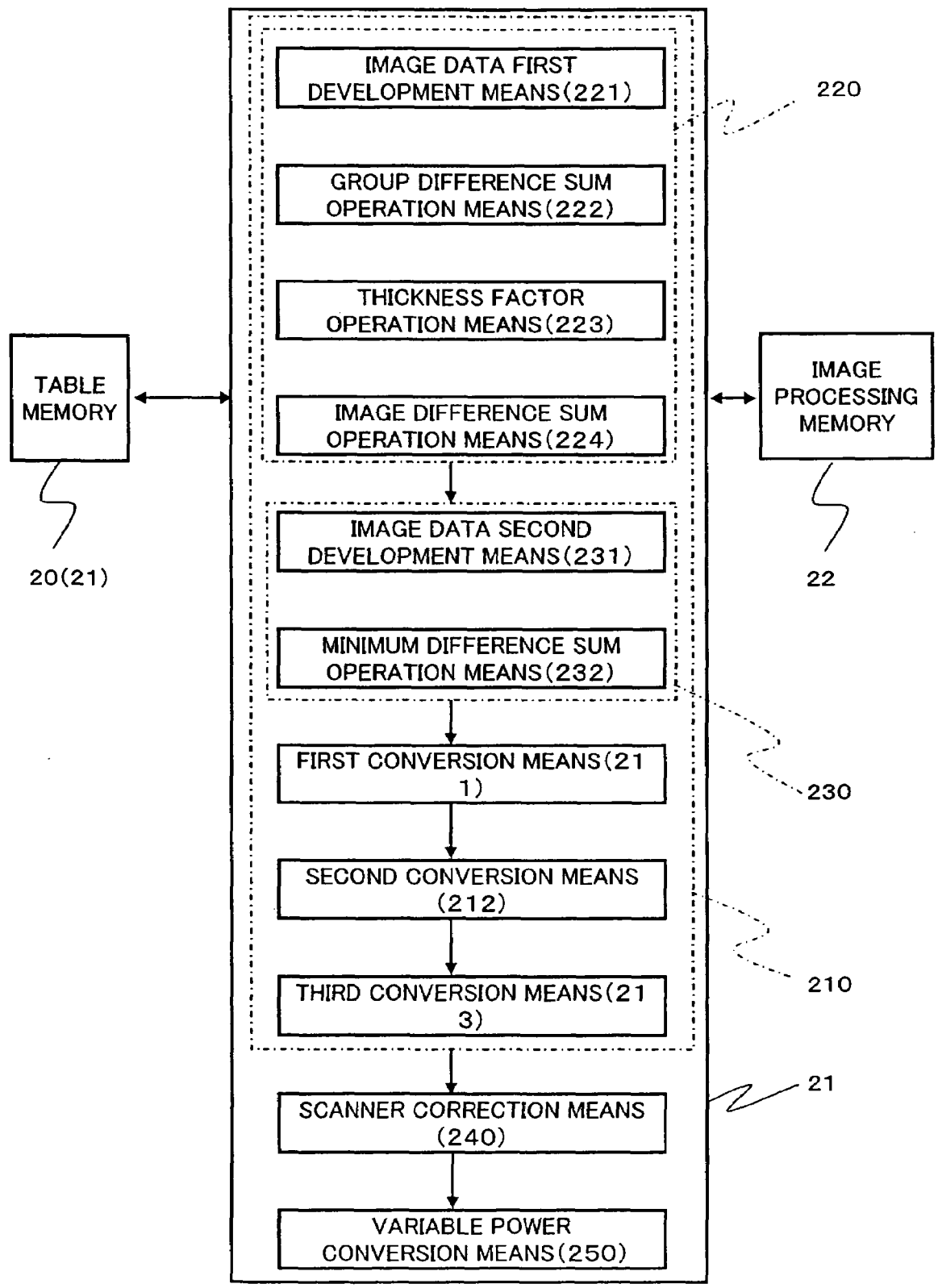
FIG. 2 is a block diagram which depicts that an image data processing section is divided to functional blocks.

The image data processing section 2 includes a processor for image processing. The image data processing section 2 will now be described based on functions executed by the processor. As shown in FIG. 2, the image data processing section 2 includes a different-type-light-source image correction means 210 comprised of a first conversion means 211, a second conversion means 212, and a third conversion means 213, for conducting a different-type-light-source image correction to target film image data stored in the image data storage section 121, a scanner correction means 240 for conducting a gradation correction thereto, a variable power conversion means 250 for adjusting a film image to an output size, and the like.

The different-type-light-source image correction means 210 also includes a different-type-light-source image determination means 220 that includes an image data first development means 221, a group different sum operation means 222, a thickness factor operation means 223, and an image difference sum operation means 224, and a different-color structure determination means 230 including an image data second development means 231 and a minimum difference sum operation means 232.

Figure 4:
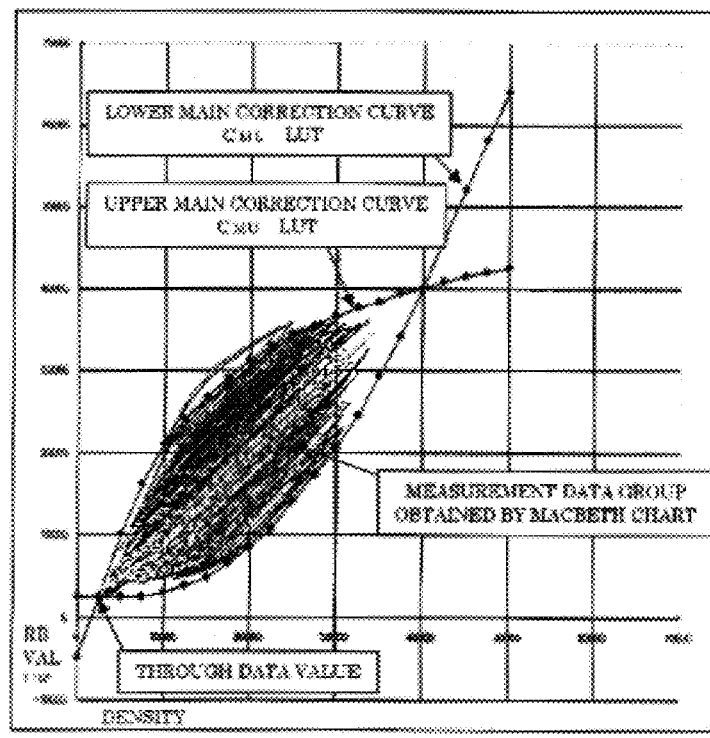
FIG. 4 is an explanatory view for generating upper and lower main correction curves.

Basic processings for the different-type-light-source image correction will now be described. As shown in FIG. 4, an upper main correction curve lookup table ("LUT") and a lower main correction curve LUT are created in advance and stored in one section of the table memory 20. The upper main correction curve LUT and the lower main correction curve LUT specify an upper main correction curve $C_{MU}$ defining an upper boundary of distributed pixels that form a basis for the different-type-light-source image correction, and a lower main correction curve $C_{ML}$ defining a lower boundary thereof as coordinate data with a predetermined density distance kept therebetween, respectively, relative to a scatter diagram obtained by subtracting respective base densities of R, G, and B of a specific film represented by an X-Y two-dimensional coordinate system, in which a Y axis indicates respective pixel component data on R, G, and B and an X axis indicates an RGB average density, from a scatter diagram representing color developing limit characteristics for the specific film.

Figure 3:
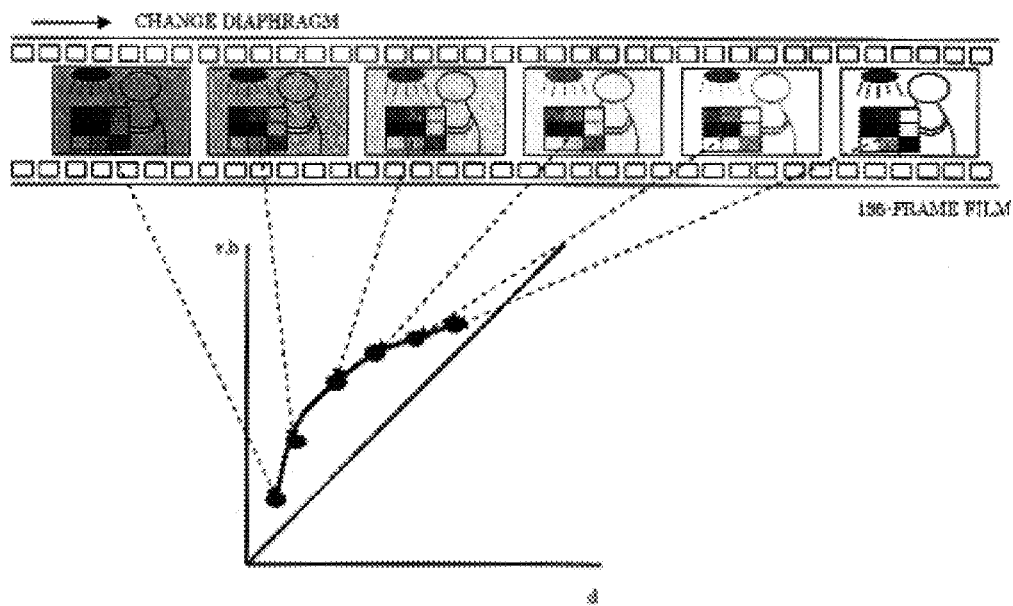
FIG. 3 is an explanatory view which depicts procedures for obtaining color developing limit characteristics of a film.

As shown in FIG. 3, the color developing limit characteristics are calculated by developing photometric data for a Macbeth color chart image photographed while changing an exposure using the tungsten light which is one of different types of light sources in this embodiment. If daylight films are used, the films exhibit the same color developing limit characteristics. The color chart image having a high color saturation exhibits the same color developing limit characteristics even if the standard light is used as an exposure light.

According to the present invention, the correction curves that form the basis for the different-type-light-source image correction, the different-type-light-source image correction processing, and the different-color structure correction processing are not limited to those based on the scatter diagram represented by the X-Y two-dimensional coordinate system with the Y axis indicating the R and B pixel component data and X axis indicating the RGB average density. Alternatively, these processings are similarly applicable to a scatter diagram represented by a predetermined X-Y two-dimensional coordinate system with one axis indicating one of the pixel component data on R, G, and B. For example, any scatter diagrams representing the color developing limit characteristics of the film such as a scatter diagram in which an X axis indicates a G component density and a Y axis indicates R and B component densities, and a scatter diagram in which an X axis indicates a logarithmically converted exposure and a Y axis indicates R, G, and B component densities. In this embodiment, these processings will be described based on the scatter diagram represented by the X-Y two-dimensional coordinate system in which the Y axis indicates the R and B pixel component data and the X axis indicates the RGB average density.

The different-type-light-source image correction processing conducted to the upper main correction curve will now be described. It is noted that the different-type-light-source image correction processing is conducted to the lower main correction curve according to the same procedures as those for the upper main correction curve. Although not shown in the figures, an LUT correction means included in the different-type-light-source image correction means 210 shifts the respective LUT's based on film base densities of the input film image data to eliminate the influence of the base densities on the target film, and calculates a dissociation degree (which indicates a distance of each point on the upper main correction curve $C_{MU}$ to the reference line L) between the upper main correction curve $C_{MU}$ specified by the LUT shown in FIG. 5A and the reference line L (which is ideally the line having an angle of 45 degrees with respect to the X axis) representing the characteristics of the film image photographed using the standard light. An upper sub-correction curve $C_{SU}$ having a smaller dissociation degree than the calculated dissociation degree by a predetermined rate, i.e., half the calculated dissociation degree is specified. A sub-correction curve LUT is created so that the upper sub-correction curve $C_{SU}$ contacts with the reference line L, and stored in the storage means 21 that forms a part of the table memory 20.

Figure 5A:
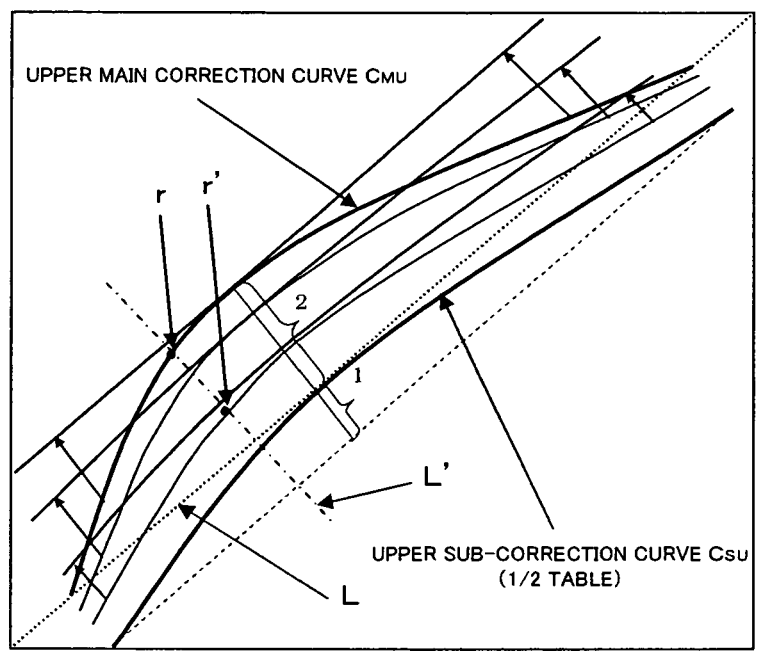
FIGS. 5A and 5B are explanatory views which depict procedures for correcting a different-type-light-source image.
Figure 5B:
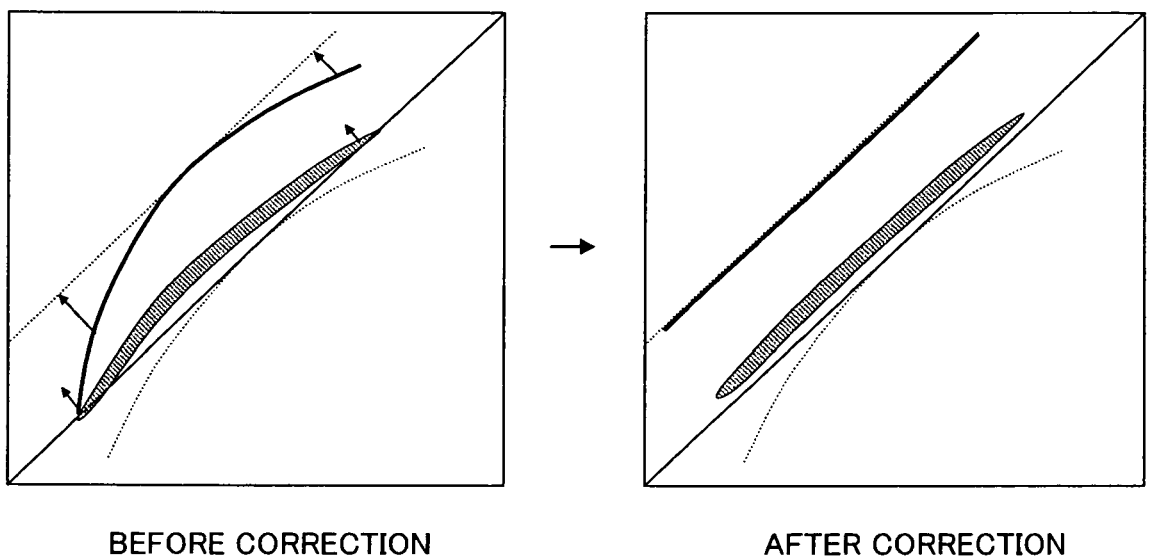

As shown in FIG. 5A, the first conversion means 211 develops the target film image data so as to correspond to the X-Y two-dimensional coordinate system. The first conversion means 211 then operates and derives an upper movement amount so as to move each pixel r' distributed on a specific line L' in parallel to a line orthogonal to the reference line L, relative to pixel components maldistributed upward among those of R, G, or B along the specific line L' based on the upper main correction curve LUT and the upper sub-correction curve LUT and based on a reference movement ratio. The "reference movement ratio" means herein a ratio by which a pixel r on the upper main correction curve $C_{MU}$ moves along the specific line L' on the line in contact with the upper main correction curve $C_{MU}$ and in parallel to the reference line L with reference to the upper sub-correction curve $C_{SU}$.

Likewise, the first conversion means 211 operates and derives a lower movement amount so as to move each pixel distributed on the specific line, relative to pixel components maldistributed downward among those of R, G, or B along the specific line based on the lower main correction curve LUT and the lower sub-correction curve LUT and based on a reference movement ratio. The "reference movement ratio" means herein a ratio by which a pixel on the lower main correction curve moves along the specific line on the line in contact with the lower main correction curve and in parallel to the reference line with reference to the lower sub-correction curve.

Figure 6A:
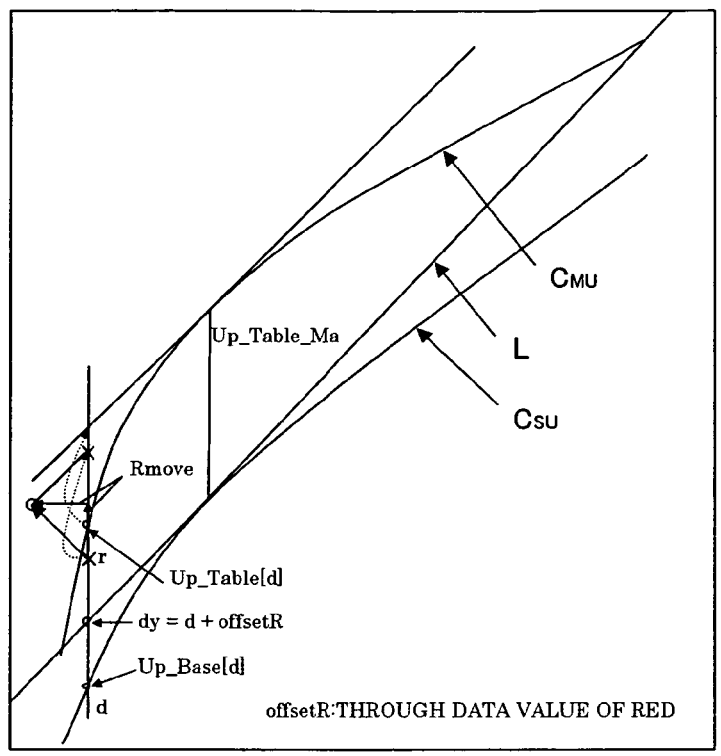
FIGS. 6A and 6B are explanatory views which depict operation procedures of a first conversion means.

An instance in which the target film image data is the different-type-light-source image photographed by the tungsten light will be described specifically. As shown in FIG. 14A, the R component is distributed upward and the B component is distributed downward. Therefore, as shown in FIG. 6A, for the R component pixels located upward of the upper sub-correction curve $C_{SU}$, a movement amount in a Y-axis direction and an X-axis direction of a Y-axis value r in an portion of an X-axis value d is operated and derived as a movement amount Rmove of moving to a position of a white circle at an angle of 45 degrees by a calculation equation expressed by Equation 5. As a result, the movement amount of a pixel on the upper main correction curve $C_{MU}$ is operated so as to be located on the line in contact with the upper main correction curve $C_{MU}$ and in parallel to the reference line L, the movement amount of a pixel smaller than the pixel on the upper main correction curve $C_{MU}$ is operated so as to move at a slightly lower level. Thus, pixels near the upper sub-correction curve $C_{SU}$ hardly move.

$$\text{Rmove} = (r - \text{Up\_Base}[d])/(\text{Up\_Table}[d] - \text{Up\_Base}[d]) \times (\text{Up\_Table\_Max} + (dy - \text{Up\_Base}[d])/2 \quad \text{Equation 5}$$

In the Equation 5, Up_Table[d] is LUT data on the upper main correction curve, Up_Base[d] is LUT data on the upper sub-correction curve, and dy=d+offsetR, where offsetR is the R component of the film base.

Figure 6B:
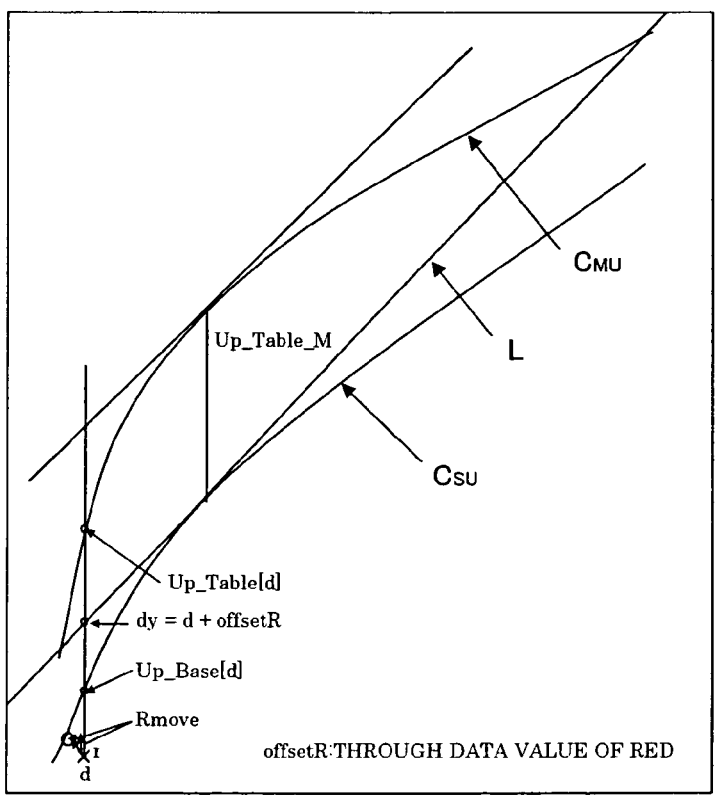

As shown in FIG. 6B, for the R component pixels located downward of the upper sub-correction curve $C_{SU}$, the movement amount of the Y-axis value r in the portion of the X-axis value d by which the r moves to the position of the white circle at the angle of 45 degrees is operated and derived by a calculation equation expressed by Equation 6.

$$\text{Rmove} = (1/\text{Up\_Base}[d] - r)/(\text{Up\_Table}[d] - \text{Up\_Base}[d]) \times (\text{Up\_Table\_Max} + (dy - \text{Up\_Base}[d])))/2 \quad \text{Equation 6}$$

In the Equation 6, Up_Table[d] is LUT data on the upper main correction curve, Up_Base[d] is LUT data on the upper sub-correction curve, and dy=d+offsetR, where offsetR is the R component of the film base.

For the B component pixels, similarly to the R component pixels located upward and downward of the upper sub-correction curve $C_{SU}$, the movement amounts of a Y-axis value b in the portion of the X-axis value d are operated and derived by performing the same operation processings as expressed by the Equations 5 and 6 based on the table data on the upper main correction curve and that on the lower sub-correction curve, respectively.

The second conversion means 212 operates an average movement amount in the X-axis direction as a relative movement amount in the X-axis direction so that the average RBG densities are equal among the respective pixels based on the upper movement amount that is the movement amount for the R component pixels and on the lower movement amount that is the movement amount for the B component pixels operated and derived by the first conversion means 211. The pixel data is converted to new pixel data so as to move based on an operation result.

Figure 7A:
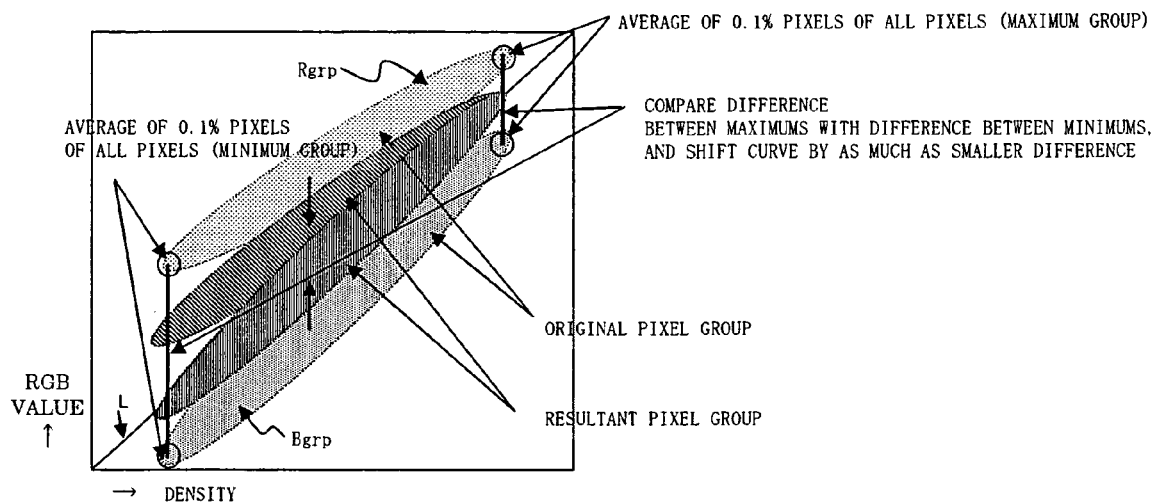
FIGS. 7A and 7B are explanatory views which depict operation procedures of a third conversion means.
Figure 7B:
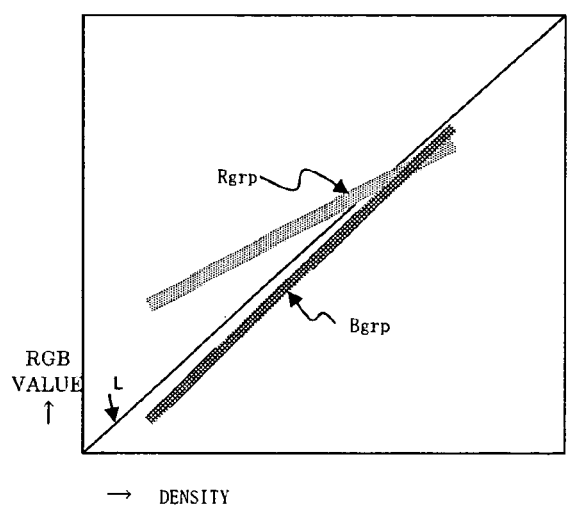

As shown in FIG. 7A, the third conversion means 213 selects a predetermined number of pixels, pixels that are 0.1 percent of all the pixels from the upper pixel group Rgrp and the lower pixel group Bgrp converted by the second conversion means, respectively, calculates average densities of a maximum density group and a minimum density group of each of the upper and lower pixel groups Rgrp and Bgrp, and moves the upper and lower pixel groups Rgrp and Bgrp along the X-axis direction so that groups having a smaller density average difference are superimposed. Accordingly, the same color component is always corrected in the same direction, thereby suppressing generation of a noise such as out of color registration. It is noted that the third conversion means 213 includes a crossing determination means for determining whether the upper and lower pixel groups converted by the second conversion means 212 cross each other as shown in FIG. 7B. Only if the crossing determination means determines that they do not cross each other, the upper and lower pixel groups are moved along the X axis.

Alternatively, the third conversion means 213 may operate and derive average densities of the upper and lower pixel groups converted by the second conversion means 212, respectively, and move the upper and lower pixel groups along the Y axis so that pixels corresponding to the average densities thus operated and derived move to the reference line. In the alternative, similarly to the above, the upper and lower pixel groups are moved along the X axis only if the crossing determination means determines that the groups do not cross each other.

The instance in which the target film image is the different-type-light-source image photographed by the tungsten light has been described above. If the target film image is the image photographed underwater, R and B distributions are reversed from those for the photographic image by the tungsten light as shown in FIG. 14B. Therefore, the B component pixels are corrected based on the upper main correction curve and the upper sub-correction curve, and the R component pixels are corrected based on the lower main correction curve and the lower sub-correction curve.

The scanner correction means 240 carries out the gradation correction processing to the film image data which has thus subjected to the different-type-light-source image correction so as to correct color variations in frames. The variable power conversion means 250 carries out a compression or an expansion conversion for converting the film image data to the output size. The gradation correction will be described. The scanner correction means 240 extracts an achromatic color region from the film image data, calculates an RGB ratio of the extracted region, and converts the film image data so as to exhibit predetermined gradation characteristics based on a gradation correction LUT stored in the table memory 20.

The basic processings for the different-type-light-source image correction have been described above. Actually, however, there is a difference in degree among different-light-source images, so that there is a limit to correction based on the main correction curve uniformly prepared as table data. Further, if a different-color structure is photographed by the standard color and the resultant photographic image is subjected to the different-light-source image correction stated above, a color failure sometimes occurs. Specific correction processings and the like carried out by the different-light-source image determination means 220 and the different-color structure determination means 230 will next be described.

Figure 11A:
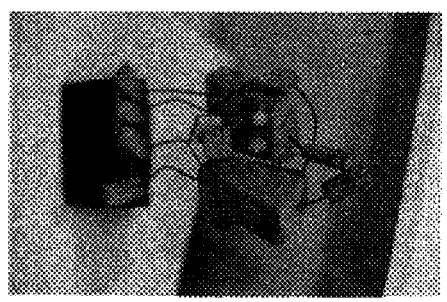
FIGS. 11A and 11B are explanatory views for comparing the different-type-light-source image with the different-color structure image.
Figure 11A:
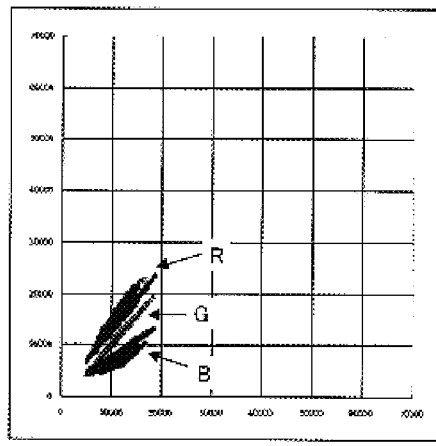
Figure 11B:
Figure 11B:
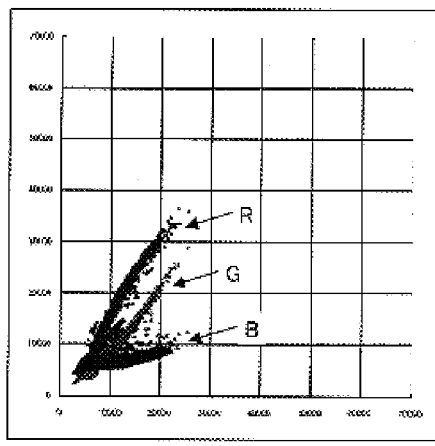

The "different-color structure" means herein a specific object if a main subject is not influenced by a photographic light source but the specific object obviously different in colors from the subject largely occupies an image plane. As different-color structure scene, the following two types of scenes are known. One is an ordinary scene, as shown in, for example, a left photograph of FIG. 11B, in which a yellow structure is present. The other is a scene in which, for example, a person is present in front of a tank in an aquarium or the like. Since the different-color structure photograph shown left of FIG. 11B should not be originally subjected to the different-type-light source correction stated above because the structure only appears in the photograph. However, according to a scatter diagram of the different-color structure photograph shown right of FIG. 11B, R and B pixel groups are greatly distanced from each other. Due to this, the photograph is determined as the different-type-light source image and subjected to the different-type-light-source image correction.

Figure 12A:
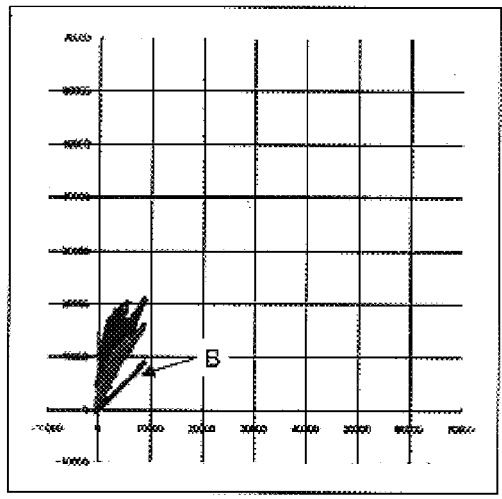
FIGS. 12A and 12B are explanatory views for comparing the different-type-light-source image with the different-color structure image.
Figure 12B:
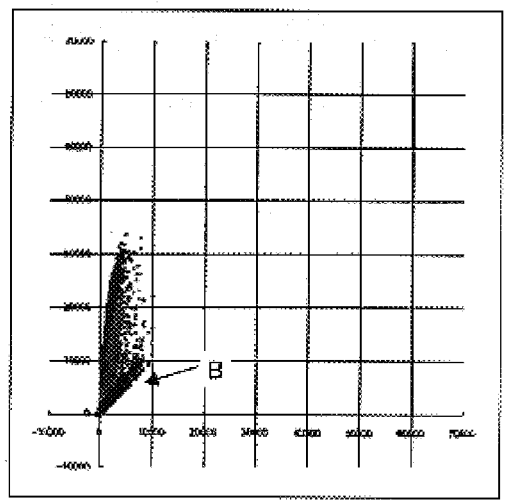

Considering this, a scatter diagram with an X axis indicating a maximum value of R, G, and B for each pixel is created as shown in FIG. 12B. According to the scatter diagram shown in FIG. 12B, the B pixel group is distributed thick relative to the reference line exhibiting the characteristics of the film image photographed by the standard light (which line is not shown in FIG. 12B but which is a line having a tilt angle of 45 degrees with respect to the X axis). Likewise, a scatter diagram of a tungsten light scene photograph shown left of FIG. 11A, R and G pixel groups are greatly distanced from each other as shown right of FIG. 11A. However, as shown in FIG. 12A, a scatter diagram with an X axis indicating a minimum of R, G, and B for each pixel is created. According to the scatter diagram shown in FIG. 12A, the B pixel group is distributed thin relative to the reference line exhibiting the characteristics of the film image photographed using the standard light.

Accordingly, the target film image data is developed so as to correspond to the predetermined X-Y two-dimensional coordinate system representing the relationship between the minimum of the RGB component data and the RGB component data for the minimum for each constituent pixel. The average of the dissociations of the respective pixels for the reference line representing the characteristics of the film image photographed by the standard light is operated and derived as the minimum difference sum at least for the R or B pixel group. If the minimum difference sum for the R or B pixel group thus operated and derived is greater than a predetermined reference value, the image can be determined as the photographic image in which the different-color structure photograph appears. If one of the image difference sums is greater than a predetermined value and the image is not determined as the photographic image in which the different-color structure appears in a seventh step, the image is determined as the different-type-light-source photographic image. It is thereby possible to ensure avoiding erroneous determination due to the different-color structure.

As shown in FIG. 9, the image data first development means 221 included in the different-type-light-source image determination means 220 develops the target film image data photographed using, for example, the tungsten light to the predetermined X-Y two-dimensional coordinate system with the X axis indicating the average data on R, G, and B for each constituent pixel and the Y axis indicating respective color component data on the image processing memory 22. The group difference sum operation means 222 divides the pixel group, which is the pixel group Rgrp of the R component in this embodiment, developed by the image data first development means 221 to a plurality of groups (2500 groups for pixel densities represented by 16-bit data of 0 to 65535 in this embodiment) in a direction perpendicular to the reference line L representing the characteristics of the film image photographed using the standard light so that the RGB average data average data on the respective pixels are arranged equidistantly. The group difference sum operation means 222 then operates and derives the average of dissociations of the respective pixels relative to the reference line L as the group difference sum expressed by Equation 1 for each of R, G, and B. The pixel group the number of which is one percent or less of the total number of pixels is removed as a noise component.

$$S(i) = \{\Sigma C_j \cos\theta - ((R_j + G_j + B_j)/3)\sin\theta\}/n \quad \text{Equation 1}$$

In the Equation 1, S(i) is the group difference sum of an $i^{th}$ group, $C_j$ is a pixel density of R, G, or B of a $j^{th}$ pixel, θ is an angle between the reference line and the X axis, which angle is ideally 45 degrees, and n is the number of pixels of the $i^{th}$ group.

Next, the thickness factor that is a normalized distribution thickness in a direction in which the pixel distribution represented by Equation 2 is distanced from the reference line, is operated and derived for each of the groups divided by the thickness factor operation means 223.

$$G(i) = A/[\{(\Sigma C_{mMAX} \cos\theta - ((R_m + G_m + B_m)/3)\sin\theta)/m\} - \{(\Sigma C_{mMIN} \cos\theta - ((R_m + G_m + B_m)/3)\sin\theta)/m\}] \quad \text{Equation 2}$$

In the Equation 2, at G(i)≧1, G(i)=1, where G(i) is the thickness factor of the pixel distribution of the $i^{th}$ group, $C_{mMAX}$ is a maximum pixel density of R, G, or B when the RGB average density is $(R_m+G_m+B_m)/3$, $C_{mMIN}$ is a minimum pixel density of R, G, or B when the RGB average density is $(R_m+G_m+B_m)/3$, and m is the number of pixels in the group having the maximum or minimum.

The image difference sum operation means 224 operates and derives the image difference sum S expressed by Equation 3 based on the group difference sum operated and derived by the group difference sum operation means 222, and on the thickness factor operated and derived by the thickness factor operation means 223.

$$S = S_B + [\Sigma\{S(i) - S_B\} \times G(i)]/I \quad \text{Equation 3}$$

In the Equation 3, I is the number of groups, $S_B$ is a reference group difference sum, that is, a difference sum of the group for which the difference between the average maximum and the average minimum derived in the second step is the minimum.

The different-type-light-source image determination means 222 determines that the film image is the different-type-light-source film image if one of the image difference sums for R, G, and B operated and derived by the image difference sum operation means 224 is greater than a predetermined threshold set by an experiment or the like in advance. If so, after the upper and lower main correction curves are corrected, the different-type-light-source image correction is carried out. If the different-type-light-source image determination means 222 determines that the film image is not the different-type-light-source film image, the processing moves to correction made by the scanner correction means 240.

Figure 13A:
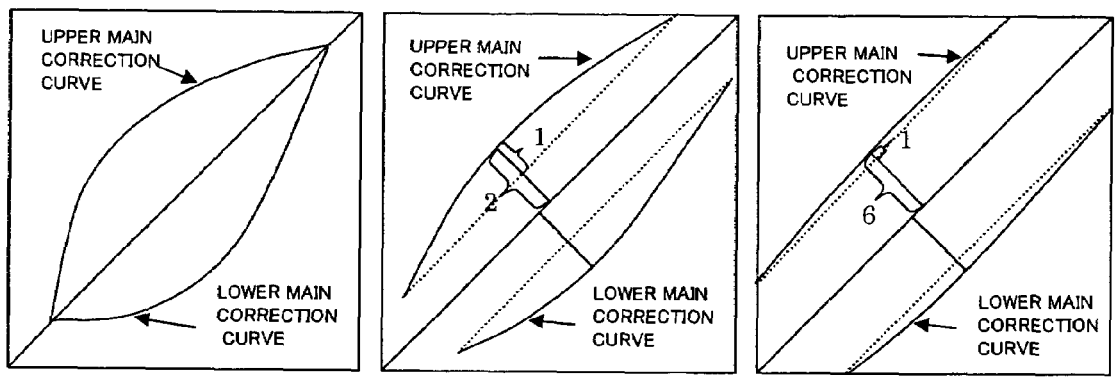
FIGS. 13A and 13B are explanatory view for a correction processing for correcting a main correction curve LUT.
Figure 13B:
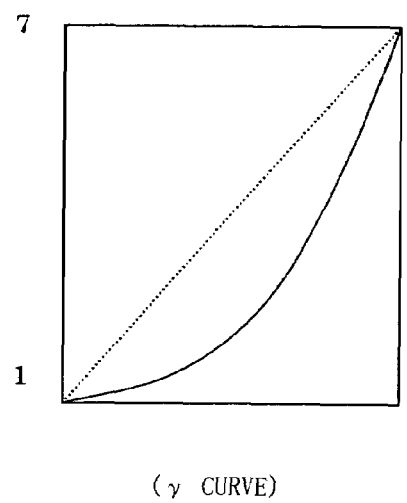

If the different-type-light-source image determination means 222 determines that the film image is the different-type-light-source film image, the upper main correction curve LUT and the lower main correction curve LUT are corrected according to a degree of the different-type-light-source image. Specifically, the LUT correction means corrects the LUT's so that a dissociation deviation relative to the maximum dissociation of the upper or lower main correction curve is smaller if the correction factor is higher as shown in FIG. 13A, based on a correction factor Lc obtained by applying the image difference sum operated and derived by the image difference sum operation means 224 to a predetermined Y curve expressed by Equation 8 and shown in FIG. 13B using a value normalized by a predetermined primary equation expressed by Equation 7 as a variable X, and ranging from 1 to 7.

$$X = (a-S)/b \quad \text{Equation 7}$$

In the Equation 7, at X≦0, X=0, a and b are constants set at zero when the degree of the different-type-light-source image is large, and set at a value ranging from 0 to 6.5 when the degree thereof is small.

$$Lc = 7 \times (X/7)^{2.1} + 1 \quad \text{Equation 8}$$

In other words, at the correction factor Lc=1, the original upper main correction curve $C_{MU}$ and the original lower main correction curve $C_{ML}$ shown in a left figure of FIG. 13A are maintained. At the correction factor Lc=2, each of the curves $C_{ML}$ and $C_{MU}$ is corrected to a curve having a bulge half as large as that of the original curve $C_{ML}$ or $C_{MU}$ as shown in a central figure of FIG. 13A. At the correction factor Lc=6, each curve is corrected to a curve having a bulge one-fifth as large as that of the original curve $C_{ML}$ or $C_{MU}$ as shown in a right figure of FIG. 13A. Namely, the higher the correction factor is, the weaker the different-type-light-source image correction is set. The upper and lower main correction curves are set based on the corrected upper and lower main correction curves, respectively.

The correction of a correction level of the different-type-light-source image, i.e., the correction of the upper and lower main curves has been described above. To carry out more preferred correction, it is preferable to calculate the correction factor Lc while adding a determination made by the different-color structure determination means 230, which will be described hereafter. The image data second development means 231 develops the target film image data to a predetermined X-Y two-dimensional coordinate system with an X axis indicating the minimum of the R, G, and B component data for each constituent pixel and a Y axis indicating the RGB component data relative to the minimum. The minimum difference sum operation means 232 operates and derives the average of the dissociations of the respective pixels relative to the reference line representing the characteristics of the film image photographed by the standard light at least for the R, G, or B pixel group as the minimum difference sum expressed by Equation 9.

$$SC = \{\Sigma C_j \cos\theta - (\text{MIN}(R_j, G_j, B_j))\sin\theta\}/n \quad \text{Equation 9}$$

In the Equation 9, SC is the minimum difference sum, $C_j$ is the pixel density of R, G, or B of the $j^{th}$ pixel, θ is the angle between the reference line and the X axis, and n is the number of pixels.

A different-color structure factor Ld is obtained by normalizing the minimum difference sum operated and derived by the minimum difference sum operation means 232 by a predetermined primary equation expressed by Equation 10. If the different-color structure factor Ld is greater than a preset, predetermined value, it is determined that the film image is the different-color structure image film. If the factor Ld is smaller than the predetermined value, it is determined that the film image is not the different-color structure image. Namely, if one of the image difference sums of R, G, and B is greater than the predetermined value and the film image is not determined as the photographic image in which the different-color structure appears, then the film image is determined as the different-type-light-source photographic image, and the different-type-light-source image correction is carried out. If the different-type-light-source image correction is carried out, the LUT's are corrected using a value obtained by multiplying the correction factor Lc by the different-color structure factor Ld as a new correction factor. By making this correction, if the film image is not the photographic image of a conspicuous different-color structure but the different-color structure factor is high, the different-type-light-source image correction is set weak.

Namely, a part of the LUT correction means is constituted by the different-type-light-source image determination means 220 and the different-color structure determination means 230. If the factor Ld is less than 1, the correction using Ld is not carried out so as not to lower the different-type-light-source correction level.

$$Ld = SC/d, \text{ where } d \text{ is a constant set to satisfy } Ld \leq 2. \quad \text{Equation 10}$$

Figure 8A:
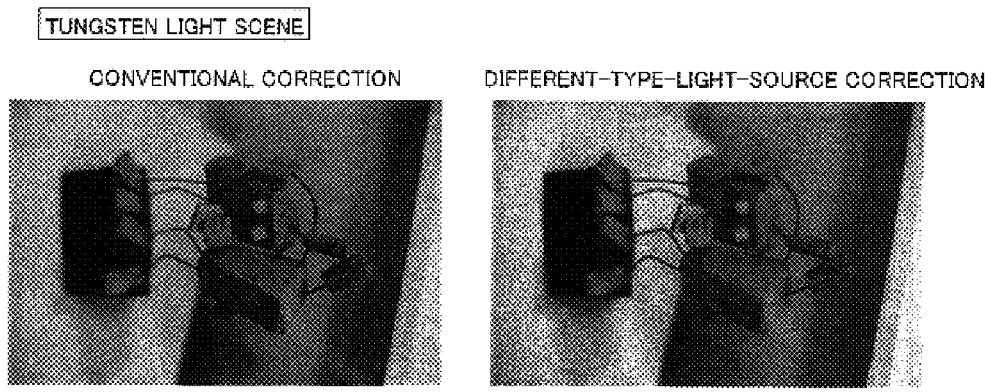
FIGS. 8A to 8C depict photographic images for comparing corrected images according to the present invention with corrected images according to the conventional art for the different-type-light-source image.
Figure 8B:
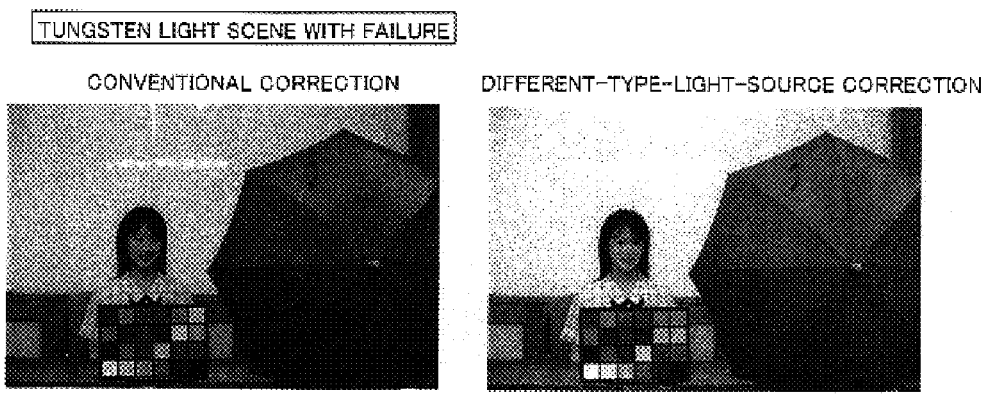
Figure 8C:
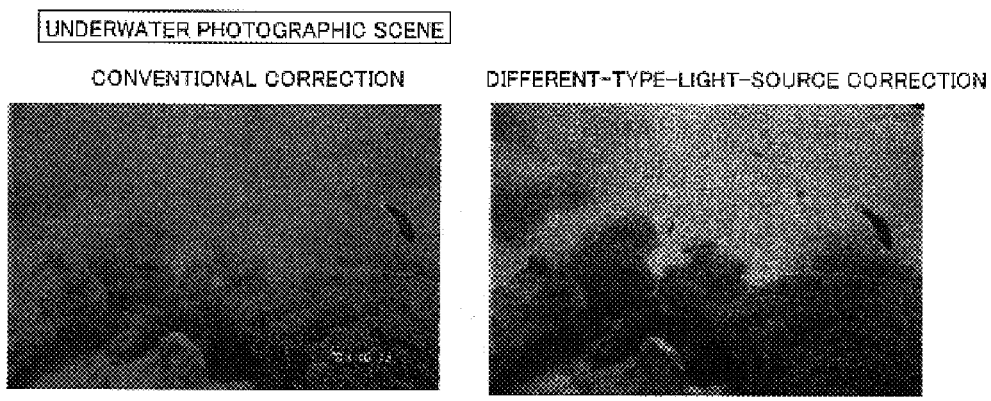

Results of the correction processings conducted to the different-type-light-source image are shown in right photographs of FIGS. 8A, 8B, and 8C, respectively. As can be understood from the photographs, the correction greatly differs from the conventional correction and occurrence of the color failure is suppressed.

The constants in the Equations 7, 8, and 10 are set appropriately by trials conducted to samples of various different-type-light-source images. Further, an intensity of the correction level can be set by multiplying the correction factor Lc by the value obtained by normalizing the image difference sum S by the primary equation.

A photographic image processing method according to the present invention is suitable particularly for a digital exposure photographic image processing apparatus. According to the embodiment stated above, the instance of adopting the exposure head of the optical shutter type has been described. The exposure head of any type such as a laser type or an FOCRT type can be employed.

As stated so far, the present invention can provide the different-type-light-source photographic image determination method capable of ensuring determining whether a photographic image is a different-type-light-source photographic image no matter what subject photographed by no matter what camera, and the photographic image processing apparatus using the determination method.

The preferred embodiment of the present invention has been described so far. However, the present invention is not limited to the embodiment, but various changes and modifications can be appropriately made to the present invention within a range of the scope of the technical concept of the present invention.

What is claimed is:

1. A different-type-light-source photographic image determination method comprising:
   a first step of developing data on a target film image so as to correspond to a predetermined X-Y two-dimensional coordinate system representing a relationship between RGB average data on each constituent pixel and respective color component data, and of dividing developed pixels to a plurality of groups so that pieces of the RGB average data on the respective pixels are arranged equidistantly;
   a second step of operating and deriving an average of dissociations of the respective pixels relative to a reference line representing characteristics of a film image photographed by a standard light as a group difference sum for each of the divided groups, for each of R, G, and B;
   a third step of operating and deriving a thickness factor for normalizing a distribution thickness of a pixel distribution in a direction in which the pixel distribution is distanced from said reference line, for each of the divided groups; and
   a fourth step of operating and deriving an image difference sum by a product-sum operation between the group difference sum operated and derived in the second step and the thickness factor operated and derived in the third step, wherein
   if the image difference sum for the R, G, or B operated and derived in the fourth step is greater than a predetermined value, the target film image is determined as a photographic image photographed using different types of light sources.

2. The method according to claim 1, further comprising:
   a fifth step, executed after said fourth step, of developing the data on the target film image so as to correspond to a predetermined X-Y two-dimensional coordinate system representing a relationship between a minimum of component data on the, R, G, and B for the each constituent pixel and the component data on the R, G, and B relative to the minimum;
   a sixth step of operating and deriving, from the pixel data developed in the fifth step, the average of the dissociations of the respective pixels relative to the reference line representing the characteristics of the film image photographed by the standard light as a minimum difference sum at least for a pixel group of the R, G, or B; and
   a seventh step of determining that the target film image is a photographic image in which a structure having different colors is photographed if the minimum difference sum for the pixel group of the R, G, or B operated and derived in the sixth step is greater than a predetermined reference value, wherein
   if the image difference sum for the R, G, or B operated and derived in the fourth step is greater than the predetermined value, and it is determined in the seventh step that the target film image is not the photographic image in which the structure having the different colors is photographed, then the target film image is determined as the photographic image photographed using the different types of the light sources.

3. A photographic image processing apparatus capable of determining whether a target film image is a photographic image photographed using different types of light sources, the apparatus comprising:
   image data first development means for developing data on the target film image so as to correspond to a predetermined X-Y two-dimensional coordinate system representing a relationship between RGB average data on each constituent pixel and respective color component data;
   group difference sum operation means for dividing developed pixels to a plurality of groups so that pieces of the RGB average data on the respective pixels are arranged equidistantly, and for operating and deriving an average of dissociations of the respective pixels relative to a reference line representing characteristics of a film image photographed by a standard light as a group difference sum for each of the divided groups, for each of R, G, and B;
   thickness factor operation means for operating and deriving a thickness factor for normalizing a distribution thickness of a pixel distribution in a direction in which the pixel distribution is distanced from said reference line, for each of the divided groups;
   image difference sum operation means for operating and deriving an image difference sum by a product-sum operation between the group difference sum operated and derived by said group difference sum operation means and the thickness factor operated and derived by said thickness factor operation means; and
   different-type-light-source image determination means for determining that the target film image is the photographic image photographed using the different types of the light sources if the image difference sum for the R, G, or B operated and derived by said image difference sum operation means is greater than a predetermined value.

4. A photographic image processing apparatus capable of determining whether a target film image is a photographic image photographed using different types of light sources, the apparatus comprising:

image data first development means for developing data on the target film image so as to correspond to a predetermined X-Y two-dimensional coordinate system representing a relationship between RGB average data on each constituent pixel and respective color component data;

group difference sum operation means for dividing developed pixels to a plurality of groups so that pieces of the RGB average data on the respective pixels are arranged equidistantly, and for operating and deriving an average of dissociations of the respective pixels relative to a reference line representing characteristics of a film image photographed by a standard light as a group difference sum expressed by an Equation 1 for each of the divided groups, for each of R, G, and B, the Equation 1 being:

$S(i)=\{\Sigma C_j \cos\theta-((R_j+G_j+B_j)/3)\sin\theta\}/n$, where the $S(i)$ is the group difference sum of an $i^{th}$ group, the $C_j$ is a pixel density of R, G, or B of a $j^{th}$ pixel, the $\theta$ is an angle between the reference line and an X axis, and the n is the number of pixels of the $i^{th}$ group;

thickness factor operation means for operating and deriving a thickness factor for normalizing a distribution thickness of a pixel distribution in a direction in which the pixel distribution is distanced from said reference line, for each of the divided groups, the thickness factor expressed by an Equation 2, the Equation 2 being:

$G(i)=A/[\{(\Sigma C_{mMAX}\cos\theta-((R_m+G_m+B_m)/3)\sin\theta)/m\}-\{(\Sigma C_{mMIN}\cos\theta-((R_{m+Gm}+B_m)/3)\sin\theta)/m\}]$, where at $G(i)\geq 1$, $G(i)=1$, the $G(i)$ is the thickness factor of the pixel distribution of the $i^{th}$ group, the $C_{mMAX}$ is a maximum pixel density of the R, G, or B when the RGB average density is $(R_m+G_m+B_m)/3$, the $C_{mMIN}$ is a minimum pixel density of the R, G, or B when the RGB average density is $(R_m+G_m+B_m)/3$, and the m is the number of pixels in the group having the maximum or minimum;

image difference sum operation means for operating and deriving an image difference sum expressed by an Equation 3 by a product-sum operation between the group difference sum operated and derived by said group difference sum operation means and the thickness factor operated and derived by said thickness factor operation means, the Equation 3 being:

$S=S_B+[\Sigma\{S(i)-S_B\}\times G(i)]/I$, where the I is the number of groups, the $S_B$ is a reference group difference sum that is a difference sum of the group for which the difference between the average maximum and the average minimum derived by said group difference sum operation means is the minimum; and different-type-light-source image determination means for determining that the target film image is the photographic image photographed using the different types of the light sources if the image difference sum for the R, G, or B operated and derived by said image difference sum operation means is greater than a predetermined value.

5. The photographic image processing apparatus according to claim 3, further comprising:

image data second development means for developing the data on the target film image so as to correspond to a predetermined X-Y two-dimensional coordinate system representing a relationship between a minimum of component data on the, R, G, and B for the each constituent pixel and the component data on the R, G, and B relative to the minimum;

minimum difference sum operation means for operating and deriving, from the pixel data developed by said image data second development means, the average of the dissociations of the respective pixels relative to the reference line representing the characteristics of the film image photographed by the standard light as a minimum difference sum at least for a pixel group of the R, G, or B; and different-color structure determination means for determining that the target film image is a photographic image in which a structure having different colors is photographed if the minimum difference sum for the pixel group of the R, G, or B operated and derived by said minimum difference sum operation means is greater than a predetermined reference value, wherein if the image difference sum for the R, G, or B operated and derived by said image difference sum operation means is greater than the predetermined value, and said different-color structure determination means determines that the target film image is not the photographic image in which the structure having the different colors is photographed, then said different-type-light-source image determination means determines that the target film image is the photographic image photographed using the different types of the light sources.

6. The photographic image processing apparatus according to claim 5, wherein said minimum difference sum operation means operates and derives the minimum difference sum based on an Equation 4, the Equation 4 being:

$S=\{\Sigma C_j\cos\theta-(\text{MIN}(R_j, G_j, B_j))\sin\theta\}/n$, where the S is the minimum difference sum, the $C_j$ is the pixel density of the R, G, or B of the $j^{th}$ pixel, the $\theta$ is the angle between the reference line and the X axis, and the n is the number of pixels.

* * * * *